United States Patent [19]

Muellenberg

[11] Patent Number: 5,427,468
[45] Date of Patent: Jun. 27, 1995

[54] COUPLING ELEMENT FOR THE FRICTIONAL CONNECTION OF AN OUTER COMPONENT TO A SHAFT

[76] Inventor: Ralph Muellenberg, Im Wiesengrund 6, D-4048 Grevenbroich 12, Germany

[21] Appl. No.: 84,251
[22] PCT Filed: Jan. 6, 1992
[86] PCT No.: PCT/DE92/00003
§ 371 Date: Jul. 9, 1993
§ 102(e) Date: Jul. 9, 1993
[87] PCT Pub. No.: WO92/12355
PCT Pub. Date: Jul. 23, 1992

[30] Foreign Application Priority Data

Jan. 10, 1991 [DE] Germany .................. 9100239 U
Feb. 12, 1991 [DE] Germany .................. 41 04 217.4

[51] Int. Cl.⁶ ............................................. F16B 2/02
[52] U.S. Cl. ...................................... 403/350; 403/351; 403/367
[58] Field of Search ............... 403/350, 351, 342, 367, 403/374, 409.1

[56] References Cited

U.S. PATENT DOCUMENTS

| 436,357 | 9/1890 | King | 403/367 |
|---|---|---|---|
| 550,019 | 11/1895 | Gray et al. | 403/367 |
| 853,006 | 5/1907 | Dunlap | 403/367 |
| 954,957 | 4/1910 | Harriman et al. | 403/351 |
| 1,481,062 | 1/1924 | Johnson | 403/351 |
| 2,729,458 | 1/1956 | Sacrey | 403/350 |
| 3,419,227 | 12/1968 | Werkmeister et al. | 403/350 |
| 3,825,359 | 7/1974 | Fulton | 403/350 |
| 3,938,901 | 2/1976 | Howe, Jr. | 403/350 |
| 4,160,608 | 7/1979 | Derner et al. | |
| 4,585,367 | 4/1986 | Gall | 403/367 |
| 5,048,998 | 9/1991 | Viets | |

FOREIGN PATENT DOCUMENTS

| 0171156 | 2/1986 | European Pat. Off. |
| 1361776 | 4/1964 | France |
| 1068956 | 11/1959 | Germany |
| 1895907 | 7/1964 | Germany |
| 1294751 | 2/1971 | Germany |
| 2852018 | 6/1980 | Germany |
| 265280 | 11/1949 | Switzerland |
| 293122 | 7/1928 | United Kingdom |

Primary Examiner—Edward K. Look
Assistant Examiner—James A. Larson
Attorney, Agent, or Firm—Foley & Lardner

[57] ABSTRACT

A clamping arrangement (10) comprises a bush part (3) seated on a shaft (1) and having an outer circumferential surface (11) designed as a spiral surface (5). At one end, the bush part is connected to an outer component (100) to be fixed on the shaft (3). A clamping ring (8) provided with an inner circumferential surface (13) having a spiral surface (7) is furthermore provided on the bush part (3). The clamping ring (8) can be clamped fast on the shaft (1) by rotating it relative to the bush part (3).

6 Claims, 4 Drawing Sheets

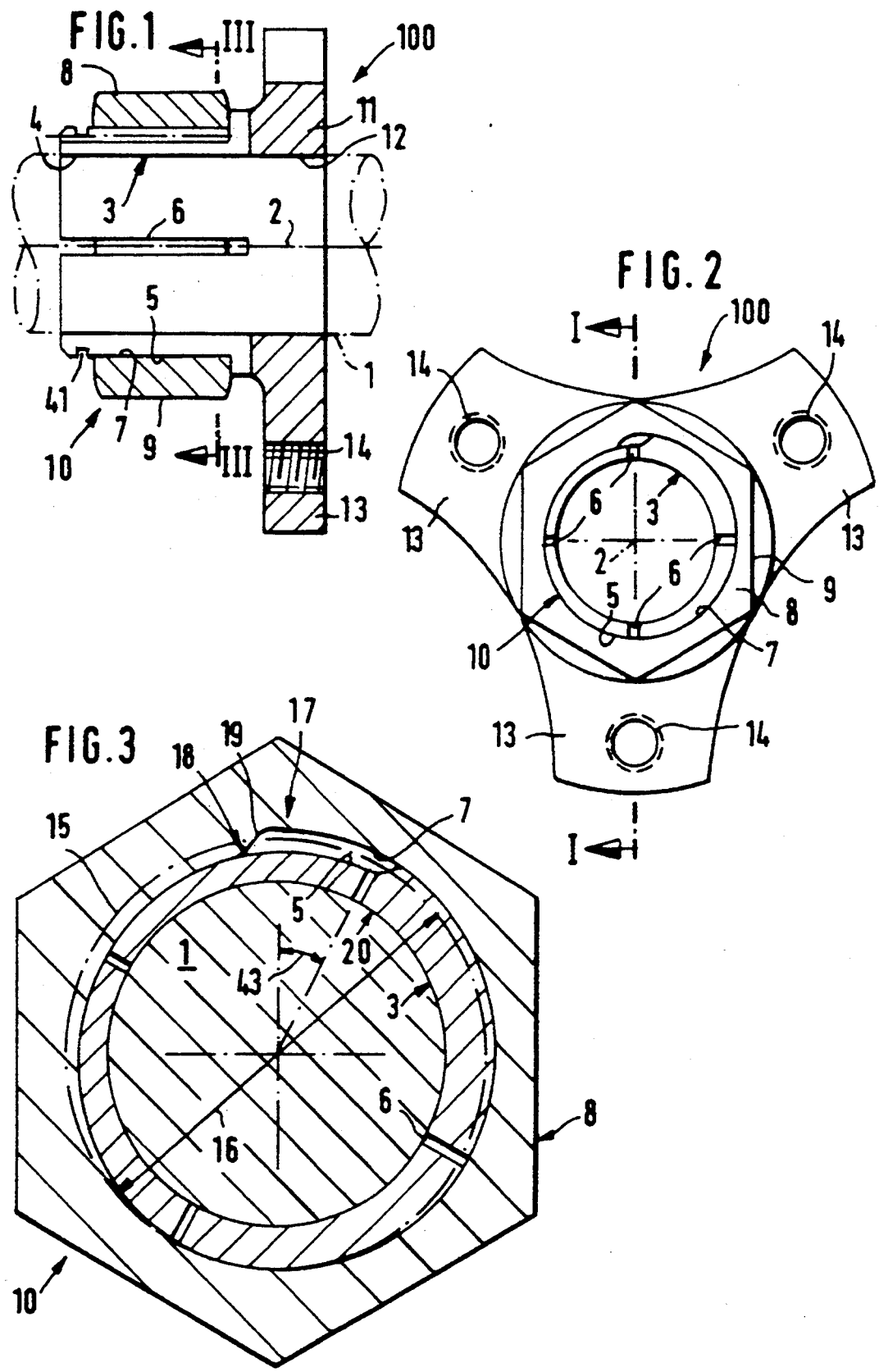

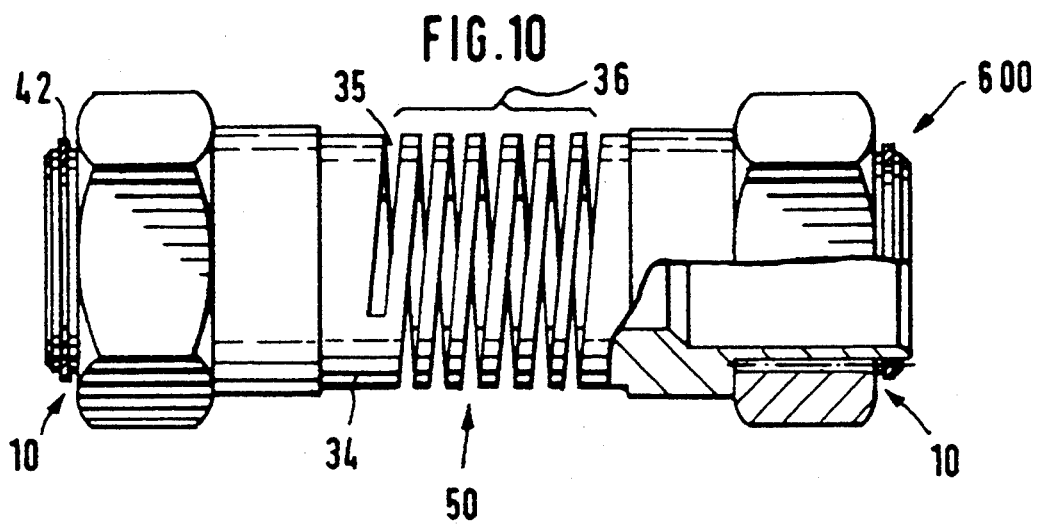
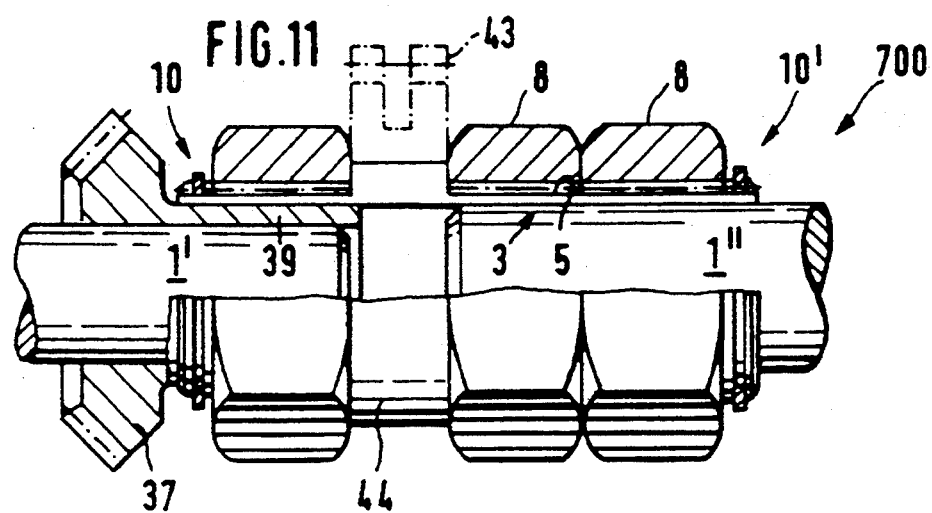
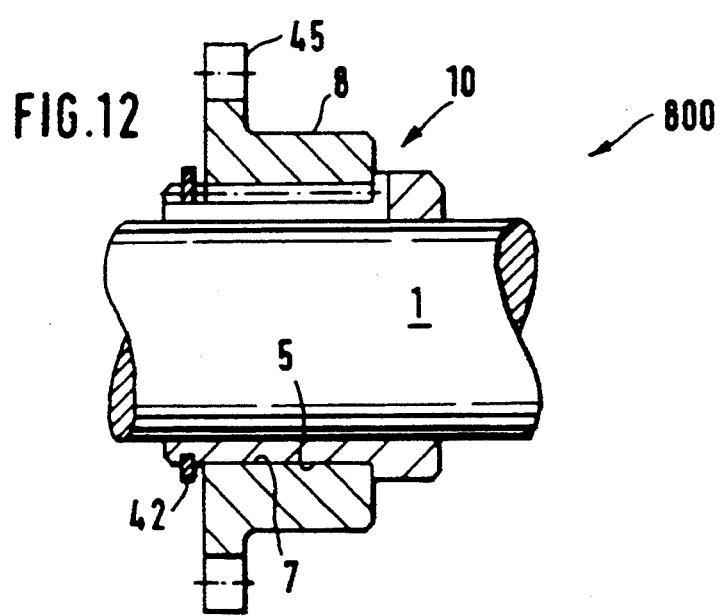

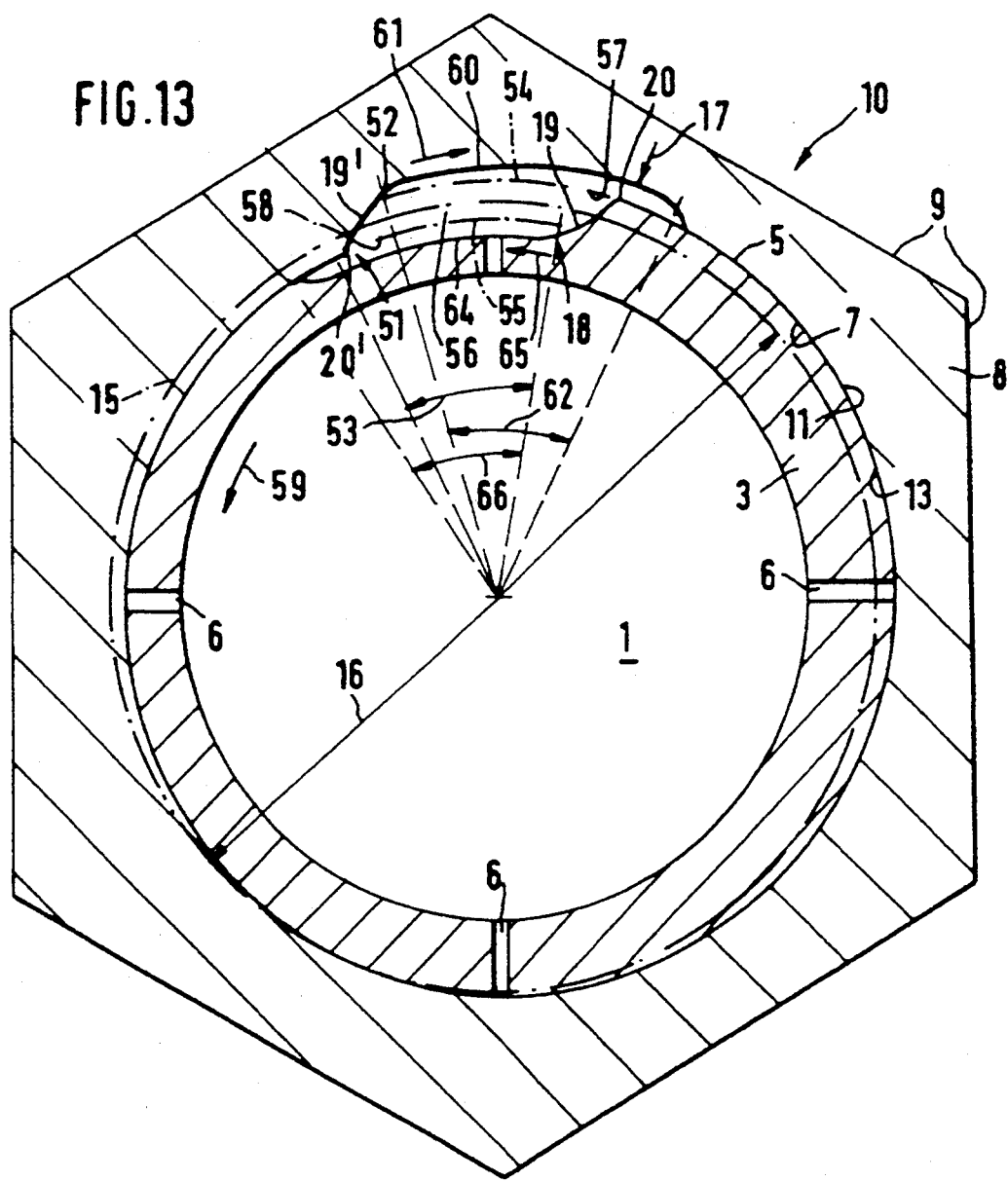

COUPLING ELEMENT FOR THE FRICTIONAL CONNECTION OF AN OUTER COMPONENT TO A SHAFT

FIELD OF THE INVENTION

Coupling elements for the frictional connection of an outer component to a shaft are known in numerous different embodiments.

DESCRIPTION OF THE PRIOR ART

German Utility Model 1,895,907 discloses a coupling element of this kind which is used to connect two aligned, abutting shaft ends of the same diameter. This joint is bridged by an internally cylindrical bush part which fits onto the shaft ends, is longitudinally slotted at one point and, axially in series on the outer circumference, has a thread and a tapered surface, the wall thickness of which decreases in the direction away from the thread. Seated on the tapered surface is an unslotted taper ring which is pressed onto the tapered surface by a threaded ring screwed onto the threaded part, the tapered surface taking up ring tensile stresses and, by radial compression, connecting the bush part frictionally to the two shaft ends.

Swiss Patent 265,280 discloses a coupling element which is used for coupling a connecting flange to the shaft. Once again, there is a bush part with an outer tapered surface and an axially adjoining thread. A threaded ring pulls the connecting flange onto the tapered surface.

In the case of one of the coupling elements according to French Patent 1,361,776, the bush part is designed as a double-taper ring, the maximum wall thickness of which lies in the center and which bridges the joint between two aligned shaft ends having the same diameter. Seated on the two outer tapered surfaces are two unslotted outer taper rings which are pulled towards one another by individual screws distributed over the circumference and, in the process, clamp the double-taper ring radially on the shaft ends. In another embodiment, there is only a single-taper ring to which a radially projecting outer component is integrally connected. The outer taper ring can be pulled onto the tapered surface of the bush part by a number of screws which are distributed over the circumference and engage in the outer component.

A similar embodiment forms the subject-matter of DE-A 1,294,751. Here, the outer component has a cylindrical axial extension on which is arranged a thin-walled compression ring which is designed as a double-taper ring, seated on the tapered surfaces of which are two unslotted taper rings which are pulled towards one another by screws distributed over the circumference and clamp the compression ring and the cylindrical extension on the shaft.

Common to all the embodiments described is the use of threads in addition to tapered surfaces, which bring about the axial displacement necessary for the frictional clamping by means of the tapered elements. The need to have threads in addition to tapered surfaces not only increases the structural complexity but makes assembly more difficult because large rotary travels have to be performed, many times in the case of the embodiments with the screws distributed over the circumference, with the additional problems associated with skewed tightening.

SUMMARY OF THE INVENTION

The object of the invention is to specify a coupling element for the frictional connection of an outer component to a shaft, which coupling element is of simpler configuration and is simpler to actuate.

This object is achieved by providing a coupling element for the frictional connection of an outer component to a shaft, having a bush part which is arranged with its inner circumferential surface on the shaft. The bush part has a longitudinal slot, over at least part of its length, at least one point, as viewed in the circumferential direction. A rotatable, circumferentially undivided clamping ring is arranged on the bush part at the level of the longitudinal slot and the inner circumferential surface.

The clamping ring interacts with the outer circumferential surface of the bush part, allowing the bush part to be compressed radially when the clamping ring is rotated and to be clamped fast with frictional engagement on the shaft.

The bush part has an outer circumferential spiral surface which is axially at the level of the longitudinal slot. The spiral surface connected to the bush part is coaxial with the axis of the inner circumferential surface of the bush part and is formed by generators which are parallel to the axis and has a pitch within the self-locking range.

An inner circumferential surface of the clamping ring is a spiral surface corresponding to the spiral surface of the bush part.

During the fixing of the coupling element on the shaft, the clamping ring is rotated relative to the bush part, the spiral surfaces sliding on one another, and radial compression of the bush part and frictional connection of the latter to the shaft taking place due to the pitch. The rotation of the clamping ring necessary with suitable tolerances is only small and, for example, amounts to at most about 45°, i.e. it requires only a single stroke of a turning tool engaging on the clamping ring to fix the coupling element ready for operation, rather than several rotations or even several rotations of a plurality of individual screws. In addition, the clamping ring does not need to be accessible from the end, i.e. the space requirement for the coupling element is essentially limited to the width of the clamping ring.

The rotary travel necessary up to the point of frictional clamping also depends on the pitch of the spiral in the circumferential direction. However, the pitch should at any event be sufficiently small for the arrangement to be self-locking, i.e. to require no additional locking in the clamped condition.

The coupling element is released by rotating the clamping ring in the opposite direction to that for fixing. In this process, the self-locking must be overcome, so that a considerable release torque may have to be applied.

In the clamped condition, the clamping ring rests with its spiral surface against the spiral surface of the bush part over a considerable part of the circumference, generally more than 315°, with full surface contact. Contact is uniform with a relatively low unit pressure, allowing local overstressing of the material to be avoided.

An arrangement with two spiral rings which are arranged one above the other in the interspace between the shaft and the recess in an outer component and produce a frictional engagement by a relative rotation, is known per se from British Patent 293,122. However, this is not a coupling element in the sense of the invention.

The torque which can be transmitted to the shaft by the frictional engagement of the bush part depends, of course, on how tightly the clamping ring is tightened. In order to increase the torque, it may be advisable, to arrange a plurality of independently actuable clamping rings next to one another on the spiral surface of the bush part (or a plurality of spiral surfaces formed on the latter).

These clamping rings can then be tightened individually, in which case the available tightening torque that can be applied, for example by hand, is then several times greater.

In a first embodiment which comes into consideration, a functional coupling element, for example a coupling flange or a toothed part intended to engage in mating teeth, is connected to the bush part.

In an alternative embodiment, two coupling elements according to the invention are connected to one another and form a coupling proper, by means of which two aligned or essentially aligned shaft ends can be connected to one another for rotation.

The clamping ring can serve purely for clamping, having a hexagonal surface or the like on the outer circumference. However, it is also possible to introduce a torque at the clamping ring during operation, via an appropriate device, such as a gear or chain rim, in which case the connection can tighten to an increasing extent in accordance with the torque.

In all the embodiments, the radius of the spiral surface, in relation to the axis of the shaft, increases in a manner proportional to the angle in the circumferential direction and then jumps back to the original radius at one point. In general, this will be after about 360° but embodiments in which the return occurs at several points, as seen in the circumferential direction, for example after only 180°, are not excluded.

With the coupling element clamped, the points of return on the inner circumferential surface of the outer component and the outer circumferential surface of the shaft are no longer adjacent to one another but separated from one another in the circumferential direction by the angle of rotation which the arrangement requires to pass from the sliding fit on the shaft to the tight fit.

Between the transitional surfaces of the inner circumferential surface of the outer component and of the outer circumferential surface of the shaft there is an open location into which moisture and air can penetrate, with the result that corrosion can form on the circumferential surfaces in this area, particularly if the coupling element is used in an aggressive environment.

When the coupling element then comes to be released, the two circumferential surfaces formed by the spiral surface are rotated back relative to one another, the edges of the transitional surfaces moving onto the corroded area of the circumferential surfaces. This makes the release of the coupling element more difficult or even impossible. Seizure of the area of each circumferential surface adjacent to the edge on the corroded part of the mating surface may occur.

There is thus the further object of designing a coupling element of the type described in such a way that release is no longer hindered in the manner described above.

This object is achieved by the configuration having spiral surfaces as described below.

The spiral surface is thus departed from, inwards or outwards, in a certain angular range to ensure that the edge of the transitional surface from the smaller radius of the spiral surface to the larger radius no longer rests against the mating surface but is, as it were, left in mid air. When the components are rotated back relative to one another, the edge can then no longer move onto corroded areas of the mating surface and be braked by any defects in the surface which may be present there.

The recesses by means of which the edges of the transitional surfaces are, as it were, freed can be cylindrical surfaces coaxial with the axis which are relatively easy to produce by milling involving rotation of the component about the axis concerned.

BRIEF DESCRIPTION OF THE DRAWING

Exemplary embodiments of the invention are depicted in the drawing, in which

FIG. 1 shows a longitudinal axial section through a first embodiment of the coupling element, along the line I—I in FIG. 2;

FIG. 2 shows a view in accordance with FIG. 1, from the left;

FIG. 3 shows a cross-section along the line III—III in FIG. 1 on an enlarged scale;

FIGS. 9 to 11 show longitudinal sections and views through further couplings;

FIG. 12 shows a longitudinal section through a further embodiment of the coupling element;

FIG. 13 shows a cross-section corresponding to that in FIG. 3 of a modified embodiment.

DESCRIPTION OF THE PREFERRED EMBODIMENTS

Figure 4:
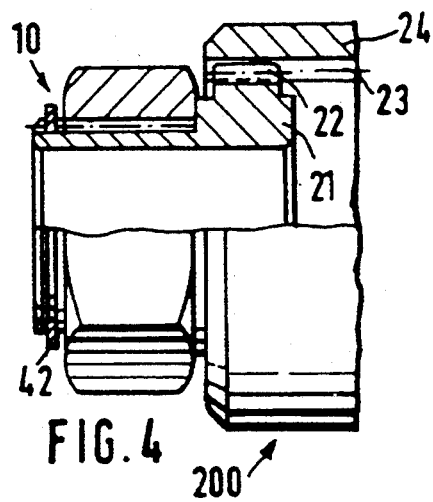
FIG. 4 shows another embodiment of the coupling element in longitudinal section.

The star-shaped disc, denoted overall by 100 in FIGS. 1 and 2, is intended to provide coupling with a shaft 1, indicated only by chain-dotted lines in FIG. 1. It comprises a flange disc 11 which is provided with a hole 12 that fits onto the shaft 1 and which has three arms 13, offset by 120°, in which are formed, at a distance from the axis 2, threaded holes 14 which serve for connection to other components, for example a flexible coupling disc or the like.

Connected integrally to the flange disc 11, in the manner of a hub, is a coupling element 10 which has a bush part 3 with a cylindrical inner circumference 4 in alignment with the hole 12 of the flange disc 11 and an outer circumferential surface which is designed as a spiral surface 5 formed by generators parallel to the axis 2 and, at four points offset by 90° in the circumferential direction, has longitudinal slots 6 which penetrate it radially and extend to just in front of the flange disc 11. Arranged on the spiral surface 5 with an inner circumferential surface designed as a corresponding spiral surface 7 is a circumferentially continuous clamping ring 8 which has a hexagonal wrench-contact surface 9 at its outer circumference.

On the side remote from the flange disc 11, the bush part 3 projects axially beyond the clamping ring 8 and there has a circumferential groove 41 at the outside for the accommodation of a snap ring 42 (FIG. 4), not shown in FIG. 1, by means of which the clamping ring 8, which is loose in the unclamped condition, is held fast on the bush part 3.

The design of the coupling element 10 is explained in detail with reference to FIG. 3. In the sectional representation, an imaginary cylindrical surface 15 with a diameter 16 is indicated by a broken line. In the first two quadrants of the cross-section, the spiral surface 7 forming the inner circumferential surface of the clamping ring 8 lies outside the imaginary cylindrical surface 15 while, in the last two quadrants, it lies within said surface. The local radius of the spiral surface 7 and also that of the spiral surface 5 decreases in a manner proportional to the angle through almost 360° in the clockwise direction from the "twelve o'clock" position 17 according to FIG. 3 and, from a point 18 having the minimum radius, makes a transition, in a short transitional region, back to the larger radius at point 17. Given a diameter of the shaft 1 of 100 mm, the difference in radius between points 17 and 18 is, for example, 2 mm. It is thus possible, by rotating the spiral surfaces 5 and 7 relative to one another through an angle 43 of 36° to bridge a radius tolerance of 0.2 mm and, in most cases, this is sufficient. The rotary withdrawal travels in question will in no case have to exceed 45°.

The clamping function can be illustrated by considering the point 20 of the bush part 3 with the maximum wall thickness or maximum radius of the spiral surface 5. If this point is moved in the clockwise direction according to FIG. 3 while the clamping ring is held fast, it rests successively against points of the spiral surface 7 which have an increasingly smaller radius. As a result, point 20 is pressed radially inwards and clamped by frictional engagement on the shaft 1.

As in the further exemplary embodiments, the embodiment of the outer circumferential surface of the clamping ring 8 having a hexagonal wrench-contact surface in the exemplary embodiment of FIGS. 1 to 3 is to be regarded as purely illustrative. It is, of course, also possible to provide other configurations in order to facilitate the turning of the clamping ring 8, e.g. a cylindrical outer circumferential surface with recesses for the engagement of a hook-type spanner wrench.

Functionally identical parts in the further exemplary embodiments are provided with the same reference numerals.

In the case of the coupling member according to FIG. 4, denoted overall by 200, a spur gear 21 engaging with its teeth 22 in corresponding teeth 23 of a coupling sleeve 24 is connected integrally to the coupling element 10, which is of identical design to that described with reference to FIGS. 1 to 3.

Figure 5:
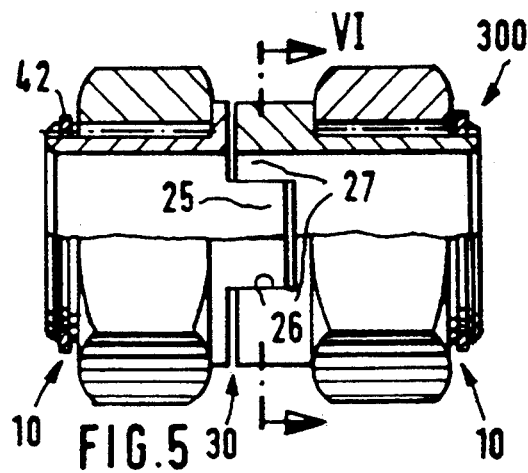
FIG. 5 shows a longitudinal section through the actual coupling with two coupling elements.
Figure 6:
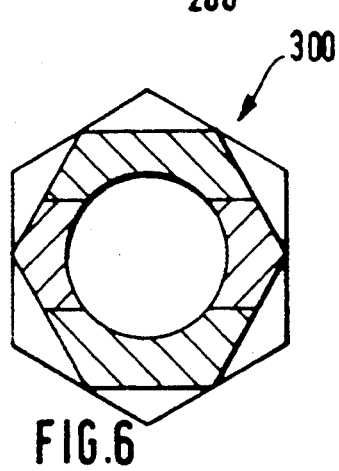
FIG. 6 shows a section along the line VI—VI in FIG. 5.

In the coupling shown in FIGS. 5 and 6, denoted overall by 300, there are two coupling elements 10 and these have a dog coupling 30 on the mutually facing sides. At its right-hand end, the coupling element 10 on the left in FIG. 5 has as the functional coupling element a dog 25 which engages in a recess 26 between the forks 27 on the left-hand end (in FIG. 5) of the right-hand coupling element 10 and thereby establishes a positive rotary connection.

Figure 7:
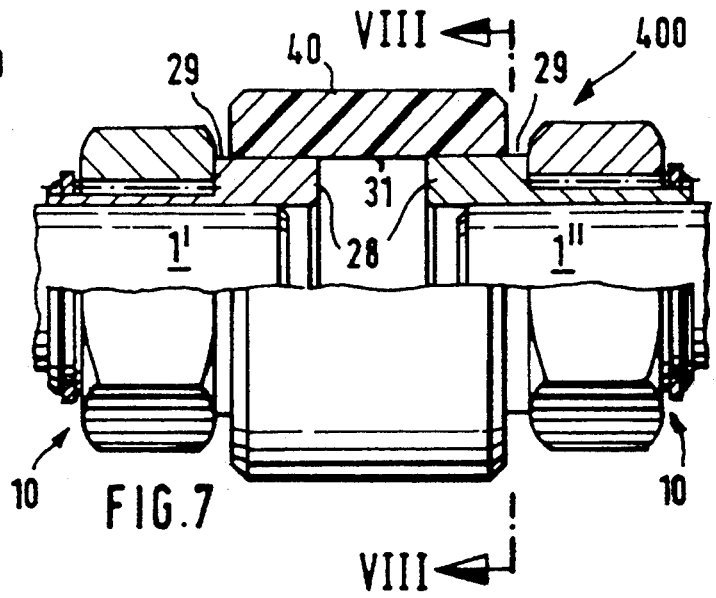
FIGS. 7 and 8 show views corresponding to those in FIGS. 5 and 6 of another embodiment.
Figure 8:
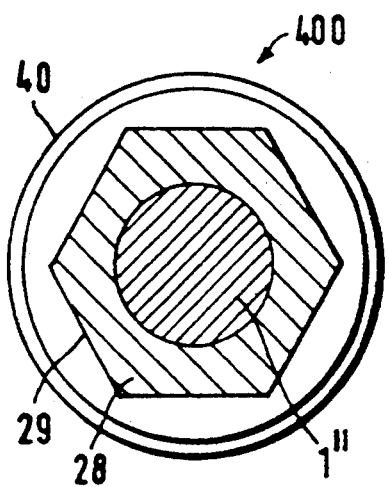

In the coupling 400 shown in FIGS. 7 and 8, the coupling elements 10 have axial extensions 28 with an outer circumferential surface which deviates from the circular, e.g. in the form of hexagon surfaces 29, which engage from both ends in a coupling bush 40 made from a flexible plastic and having a corresponding aperture 31. By means of the coupling 400, the two shaft ends 1' and 1" can be rotationally connected with a damping action.

Figure 9:
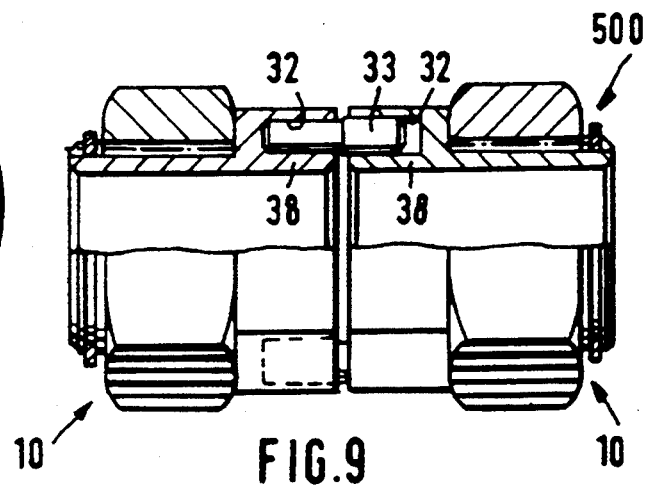

In the coupling 500 shown in FIG. 9, there are again two coupling elements 10, which can be fixed on corresponding shaft ends and, as functional coupling elements have axial extensions 38 whose end faces face one another and, in the latter, have mutually aligned holes 32 which are parallel to the axis and in which there are seated pins which bridge the joint and transmit the torque.

In the coupling 600 shown in FIG. 10, the bush parts 3 of the two coupling elements 10 are connected to one another by a hollow-cylindrical connecting part 34 in which is formed, by means of a corresponding hollow 35, a spiral spring 36 which forms a spring coupling 50 between the two coupling elements 10. Certain alignment errors of the shaft ends to be connected to one another can be compensated using the coupling 600.

In the coupling 700 shown in FIG. 11 too, there is a hollow-cylindrical connecting member 44 between the two coupling elements 10 and 10' although this connecting member is rigid in this case.

Arranged on the shaft end 1' in the left-hand half of FIG. 11 is a bevel gear 37 with a thin-walled hub 39 on which the coupling element 10 is seated. Thus, when the coupling element 10 is tightened, the coupling 700 is connected on the one hand to the bevel gear 37 and on the other hand to the shaft end 1'.

On the right-hand side of FIG. 11, on the same spiral surface 5 of the bush part 3, the coupling element 10' on that side has two clamping rings 8 arranged adjacent to one another which can both be tightened up to a limiting torque and allow the torque which can be transmitted at the circumferential surface of the shaft end 1" to be increased. Chain lines in the middle of FIG. 11, in the upper half, indicate that it is also possible for a torque to act on the connecting member 44, if, for example, it is designed as a chain wheel 43 for a double-roller chain.

In the coupling 700, the diameter of the shaft end 1" is moreover larger than that of the shaft end 1'; this can also apply to all the other embodiments.

In the embodiment 800 shown in FIG. 12, a chain wheel 45 is fixed on the shaft 1 by means of the coupling element 10. Here, the clamping ring 8 of the coupling element 10 is not, as in the other embodiments, provided with wrench-contact surfaces serving purely for initial tightening of the coupling element 10 before it is actually taken into operation, i.e. before the shaft 1 rotates; instead, the clamping ring 8 in this case has the chain wheel 45 attached to it and, in operation, i.e. when the shaft 1 is rotating, torque is introduced continuously into the clamping ring 8 via this chain wheel. In this case, the clamping ring 8 is so to speak the hub of the chain wheel 45. Given appropriate orientation of the spiral surfaces 5, 7 relative to the rotational sense of the torque, this has the effect that the connection is tightened more and more firmly the higher the torque loading becomes. Initial tightening in order to achieve an initial connection can be performed by hand or by means of a tool. In embodiment 800, the clamping ring 8 thus still has a function during the operation of the coupling element 10.

In the case of the star-shaped disc 100 shown in FIG. 1 to 3, there are four longitudinal slots 6, although this is to be regarded as purely illustrative. The bush parts of the other embodiments are slotted at one point only point. The essential point is that the spiral surfaces 5, 7 are present axially in the region of the longitudinal slots 6 to ensure that the radial compression is produced in a region which is particularly easy to deform and that no significant losses of force occur.

FIG. 13 shows an embodiment of the spiral surfaces 5, 7 which can be employed with the coupling elements of the embodiments described above.

In the sectional representation in FIG. 13, corresponding to that in FIG. 3, the imaginary cylindrical surface 15 with the diameter 16 is indicated by a broken line. In the first two quadrants of the cross-section, the spiral surface 7 forming the inner circumferential surface 13 of the clamping ring lies outside the imaginary cylindrical surface 15 while, in the last two quadrants, it lies inside the latter. The local radius of the spiral surface 5 decreases in a manner proportional to the angle through almost 360° in the clockwise direction according to FIG. 2 from a point 17 of maximum radius and, at a point 18 of minimum radius jumps back, along a transitional surface 19, to the maximum radius. The transitional surface 19 makes the transition to the region of large wall thickness of the spiral surface 5 at a point 20.

The same is true, mutatis mutandis, of the spiral surface 7 which forms the inner circumferential surface 13 of the clamping ring 8. This makes a transition at a point 52, via a transitional surface 19', from a point 51 of minimum radius to the region of maximum radius. An edge is formed at the point 51.

An angle 53 of about 35° has been traversed from the initial position, in which the transitional surfaces 19, 19' are adjacent to one another, to the clamping position shown.

If the inner circumferential surface 13 of the clamping ring 8 were to be continued between the transitional surfaces 19, 19' so as to follow the spiral surface 7, this would be according to the imaginary surface 54. The continuation of the spiral surface 5 is in accordance with the imaginary surface 55. With the clamping arrangement 10 tightened, the region 56 between the transitional surfaces 19 and 19' is open, i.e. it can be penetrated by moisture and corrosive atmosphere from outside. If an inner circumferential surface 13 were continued along the imaginary surface 54, it might be corroded in the region 57 and if an outer circumferential surface 11 were continued along the surface 55, it might be corroded in the region 58. If the clamping arrangement were then to be released, requiring a reverse rotation of the bush part 3 relative to the fixedly held clamping ring 8 in the direction of the arrow 59, the edges 20, 20' would strike the corroded zones 57 and 58 and this would require the corrosion products to be scraped off from these points or the edges 20, 20' to slide up onto the corrosion products, which would lead to jamming of the arrangement and would make release impossible.

In fact, however, the inner circumferential surface 13 of the clamping ring 8 has, starting from the transitional surface 19', a recess 60 lying outside the imaginary continuation 54 of the spiral surface 7. The recess 60 is formed by a cylindrical surface which is concentric with the axis 2 and follows on at a certain distance to the outside of the imaginary surface 54 from the transitional surface 19' or the point 52 in the direction of the displacement 61 relative to the bush part 3 which occurs during release of the clamping arrangement and extends over an angular range 62 which corresponds to the maximum angle of rotation of the parts 3 and 8 relative to one another which occurs during clamping, i.e. about 45°. In a corresponding manner, there is, adjoining the transitional surface 19 and the point 18, a recess 64 radially to the inside of the imaginary continuation 55 of the spiral surface 5 and, starting from the point 18, in the direction 65 in which the bush part 3 would have to be rotated relative to the fixedly held clamping ring 8 during release, this extends over an angle 66 corresponding to the maximum clamping angle which occurs.

In this way, the two edges 20, 20' are freed in the manner which can be seen from the drawing and, upon release of the clamping arrangement, do not need to overcome any resistances in the form of a corroded surface of the material.

The radial extent of the recesses 60, 64 has been exaggerated in the drawing. A radial relief of 0.5 to 1 mm is sufficient in practice.

I claim:

1. A coupling element for frictional connection of an outer component to a shaft, comprising:
   a bush part (3) being substantially cylindrical with an inner circumferential surface for arrangement on the shaft (1, 1', 1") and at least one longitudinal slot (6) provided over at least part of a circumferential length of the bush part; and
   at least one rotatable, circumferentially undivided clamping ring (8) arranged on the bush part (3) at an upper part of the longitudinal slot (6);
   an inner circumferential cylindrical surface of the clamping ring (8) interacting with an outer circumferential surface of the bush part (3) such that when the clamping ring (8) is rotated, the bush part (3) is compressed radially for fast frictional clamping engagement on the shaft (1, 1', 1");
   a spiral surface (5) connected to the bush part (3) arranged on the outer circumferential surface of the bush part (3), axially at an upper part of the longitudinal slot (6), and coaxial with an axis (2) of the inner circumferential surface of the bush part (3), and the spiral surface being formed by generators parallel to the axis (2) of the inner circumferential surface and, in the circumferential direction, having a pitch within a self-locking range;
   the inner circumferential surface of the clamping ring (8) being a spiral surface (7) corresponding to the spiral surface (5) of the bush part (3); and
   a recess being formed on the outer circumferential surface of the bush part and the inner circumferential cylindrical surface of the clamping ring;
   wherein the recesses respectively, extend radially to an inside and extend radially to an outside of an imaginary continuation of the spiral surfaces (5, 7) in an angular range corresponding to a maximum angle of rotation and the recesses are formed from a point of transition (18, 52) of each circumferential surface, onward, in a direction of clamping release (61,65).

2. The coupling element as claimed in claim 1, wherein a plurality of clamping rings (8, 8') are arranged next to one another on the bush part (3); and wherein each clamping ring is independently actuated.

3. The coupling element as claimed in claim 1, wherein a functional coupling element (11; 21; 25, 27; 28; 38, 34; 44) is connected to the bush part (3).

4. The coupling element as claimed in claim 1, wherein, the coupling element (10) has connected to it, via at least one coupling member (25, 27; 40; 33; 50; 44), an additional coaxially arranged coupling element (10)

of identical design to the coupling element (10) for connection to an additional shaft (1', 1'').

5. The coupling element as claimed in claim 1, wherein the clamping ring is provided with a device (45) which introduces a torque to the clamping ring during clamping operation.

6. The coupling element as claimed in claim 1, wherein the recesses (60, 64) are cylindrical surfaces with an axis corresponding to the axis (2) of the inner circumferential surface (4) of the bush part (3) but with a different radius.

* * * * *